United States Patent [19]

Harman

[11] Patent Number: 5,757,991

[45] Date of Patent: May 26, 1998

[54] OPTICAL FIBER SWITCH WITH A DEFORMABLE STRUCTURE

[76] Inventor: Murray R. Harman, 90 Ashpark Crescent, Ottawa, Canada, K1T 3N7

[21] Appl. No.: 728,556

[22] Filed: Oct. 9, 1996

[51] Int. Cl.⁶ .................................................. G02B 6/26
[52] U.S. Cl. .............................. 385/16; 385/15; 385/20; 385/23; 385/24
[58] Field of Search ............................. 385/15, 16, 17, 385/24, 23, 25, 20

[56] References Cited

U.S. PATENT DOCUMENTS

| | | |
|---|---|---|
| 5,078,514 | 1/1992 | Valette et al. .............................. 385/20 |
| 5,098,207 | 3/1992 | Blomgren .................................. 385/16 |
| 5,239,599 | 8/1993 | Harman ..................................... 385/16 |
| 5,278,692 | 1/1994 | Delapierre ............................... 385/16 X |

Primary Examiner—Brian Healy

[57] ABSTRACT

A moving fiber optical switch has a deformable pivotable element having a flexible portion and two ends at which opposite optical fiber ends are mounted to align each other in a controlled manner. The number of parts subject to wear resulting in an impairment of the accuracy of the switch has been reduced compared to earlier designs. The deformable element forms an open ring or a frame the ends of which are laterally displaceable relative to each other. The ends are restrained or partly immobilized such that during a pivotal movement of the ring or frame, the alignment of the ends, and particularly the associated end portions of opposite optical fibers, is controllably changed.

12 Claims, 8 Drawing Sheets

OPTICAL FIBER SWITCH WITH A DEFORMABLE STRUCTURE

FIELD OF THE INVENTION

This invention relates to an electromechanical moving fiber optical fiber switch, and in particular to one that utilizes a deformable structure that serves to guide and support the fibers and provide a significant mechanical advantage of motion.

BACKGROUND OF THE INVENTION

Switches are required in optic fiber applications whenever an optical path must be re-routed or redirected in some manner without having to manually alter the physical optical fiber connections. One of the more common type of switching function that is carried out is that of a fail-safe or bypass type where an optical fiber device that is connected into a system may need to be removed for servicing or adjustment. This type of switching function in its simplest form can be carried out with what is termed a one-to-two switch where one can route the optical signal from an input fiber to one of two output fibers. Of greater interest and the subject herein is that of the two-to-two bypass switch. It allows optical fiber devices to be connected in a chain for example, or in a continuous ring. In the event of a failure of one of the devices it can be switched out or removed from the chain without disturbing the remaining devices.

The task of re-routing an optical signal from one optical fiber to another is by no means a trivial one due to the small physical size of a typical optical fiber. A common communications type optical fiber waveguide is typically 125 microns in diameter having at its centre a light carrying core of only about 50 microns for the multi-mode and 9 microns in diameter for the single-mode type. If a light beam is to be successfully re-routed from one optical fiber to another, then an alignment of within a fraction of the diameter of the light carrying core must be maintained. For a single-mode optical fiber, an alignment in the order of one micron must be maintained. As a result, many optical fiber switches are constructed by inserting discrete lenses into the fiber paths in order to manipulate the light beam. This allows for the use of mirrors and other such devices, of sufficient size to be practical for assembly. The time and effort it takes to align and secure the optical elements in lens based switches places an undue demand of the level of technology and capital investment that is required to achieve significant reductions in the process costs.

U.S. Pat. No. 5,175,776 (Lee) teaches a moving fiber switch wherein the fibers are bent or pre-disposed into V-grooves and mechanically forced from one groove to another.

U.S. Pat. No. 5,239,599 (Harman) provides a structure that removes the need to provide axial positioning of the optic fiber ends by utilizing a sawn cut through continuous optical fibers as a means of creating the working gap. It teaches a form of mechanical leveraging wherein two flexible supports with optical fibers mounted thereon are moved differentially by a lever element.

In U.S. Pat. No. 4,896,935 (Lee), a two-to-two bypass type moving fiber switch is shown wherein one of the sets of optic fibers is fastened to a stepper motor shaft in order to provide movement.

U.S Pat. No. 4,407,562 (Young) shows a moving fiber switch where the fibers are translated frictionally between guide surfaces, and which relies on tolerancing of the individual elements of the structure to maintain alignment.

It is an object of the invention to provide a moving fiber optical fiber switch of enhanced simplicity, providing high accuracy and repeatability.

It is another object of the invention to provide an optical fiber switch with relatively few separate parts and connections, and therefore little possibility of the loss of accuracy and alignment due to wear and resulting play.

It is yet another object of the invention to provide an optical switch which can be used also as an optical attenuator.

SUMMARY OF THE INVENTION

In accordance with the invention there is provided a switch for controlling the relative position of opposed optical waveguides, typically optical fibers, mounted therein or thereon, such that the optical waveguides are brought repeatably into alignment in a required manner so as to realize a switching function, the system comprising:

- two fiber support members having each a proximal end and a distal end, the proximal ends adjacent to and spaced apart from each other,
- at least one optical waveguide secured to each of said fiber support members, the optical waveguides on both support members having closely spaced end portions extending therealong substantially parallel to a common optical axis, said end portions defining a gap therebetween,
- a pivotable means having two opposite ends and at least one flexible portion, said opposite ends connected respectively to the fiber support members at their distal ends,
- drive means for pivoting said pivotable member about a pivot axis, and
- restraining means associated with said at least one support member, for restraining a movement thereof along with the pivotable means about said pivot axis,
- the arrangement being such that upon activating the drive means, the pivotable means pivots about the pivot axis causing a displacement of the at least one fiber support member wherein said proximal ends of said support members, with the respective waveguide end portions, move laterally relative to each other to effect a switching action.

In a preferred embodiment of the invention, the pivotable means is integral with the fiber support members and forms an open loop with the fiber support members which are disposed at the ends of the open loop. The loop being "open" means, as will be explained hereinbelow, that it has two ends which can move relative to each other. The purpose of such loop is to serve both as a pivotable frame and as a support means for a bypass waveguide wound around it. For the purpose of such waveguide support, the loop may have any curvature (circular, elliptical, oval, or a combination thereof) provided that, preferably, the minimum radius of curvature of the loop (termed hereinafter "curvature") exceeds a minimum bending radius of the waveguide used in order to avoid excessive bending of the waveguide (fiber).

Stop means are preferably provided to limit the pivoting motion of the pivotable means in one or both directions in a predetermined manner.

BRIEF DESCRIPTION OF THE DRAWINGS

In the accompanying drawings:

FIG. 2b is an enlarged partial view of the fiber ends and of the fiber support of FIG. 2a;

FIG. 3b is an enlarged partial view of the fiber ends and of the fiber support of FIG. 3a;

DETAILED DESCRIPTION OF THE INVENTION

Figure 1A:
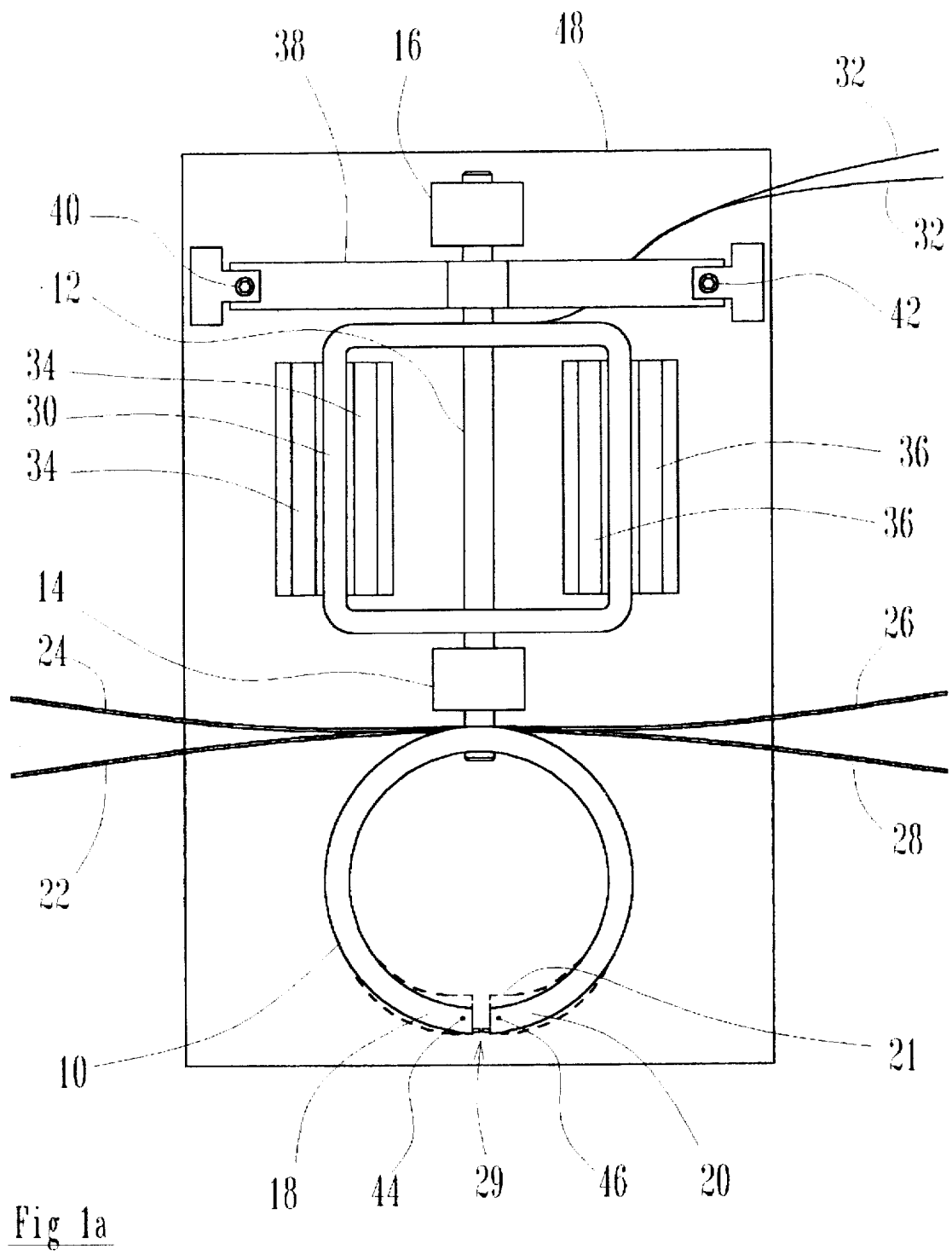
FIG. 1a is a top plan view of an embodiment of the switch of the invention.

FIG. 1a illustrates an embodiment of the switch of the invention. The pivotable means and the two fiber support members are combined by way of a circular split ring 10 which is rotatably mounted on a shaft 12 supported by two bearings 14, 16. Alternatively, V-groove elements or sleeve or ball bearings can be used as supports for the shaft 12. The ring 10 can also take the form of a regular or irregular ellipse or an equivalent shape of a curvature adapted to accommodate the minimum bending radius of an optical waveguide mounted therealong.

Two optical transmission paths are provided as represented by input optical fibers 22, 24 and output optical fibers 26, 28 mounted onto the flexible optical fiber support member 10 e.g. by way of an adhesive. A gap 29 is formed between the opposite ends of the fibers 22, 24 and 26, 28. In practice, the gap is usually created by winding the fibers around the ring 10 and fixing them to the ring e.g. by an adhesive, followed by sawing the fibers with a precision saw or other known means.

The end portions 18, 20 of the ring 10 serve as fiber support members. In the embodiment illustrated in FIG. 1a, the fiber support members are indistinguishable from the rest of the ring, but they should be "flattened" at least at their proximal opposed ends such that the opposite end portions of waveguides 22, 24 and 26, 28 respectively are disposed parallel to a common alignment axis. For more clarity, such shape is illustrated with phantom lines 21.

Consequently, in the embodiment of FIG. 1a, the ring 10 functions as a pivoting element (together with its associated fiber support members 18, 20), and as a support for a bypass section (a single coil or coils) of the fiber or another waveguide.

A controlled pivotable displacement of the shaft 12 with the ring 10 and the fibers mounted thereon is provided by an electromagnetic coil 30 which is mounted fixedly on the shaft 12. The coil has a winding with electrical connections 32. The coil is associated with magnets 34, 36 such that when electric current is applied to the coil 30 through the connections 32, a magnetic field is generated which results in a torque applied onto the coil 30 in a direction depending on the polarity of the current.

Alternatively, a controlled pivoting displacement of the ring 10 may be effected by means of a stepper motor or the like.

An arm 38 is mounted fixedly on the shaft 12 for rotation therewith. The rotational movement of the arm is limited by two stops 40, 42 which are preferably adjustable by means of common screws. For the purposes of the invention, one stop is sufficient, but two stops are preferable.

The element 10 can also take the form of an ellipse or another curved shape provided that a minimum radius of curvature of the optical fibers mounted thereon is maintained such that the waveguide wound thereon is not prone to breaking. The element 10 has some flexibility throughout. Alternatively, as will be described below, an equivalent structure may be provided with one or more distinct flexible portions. It will be understood that the loop-shaped element 10 does not have to be an "empty" ring. It may be substituted by a full shape, e.g. having spokes etc., provided that a lateral movement of the two spaced portions with the opposed fiber ends associated therewith, as described and illustrated herein, is possible.

Mounted into the left and right ends (waveguide support members) 18, 20 of the ring 10 are compliant members of high axial stiffness 44, 46 that are affixed to a base structure 48 of the switch. The rotational stiffness of the element 10 and the members 44, 46 is such that a torque generated by the coil 30 affixed to the shaft 12 is sufficient to cause a rotation of the system 10, 18, 20 as will be described further below.

Figure 1B:
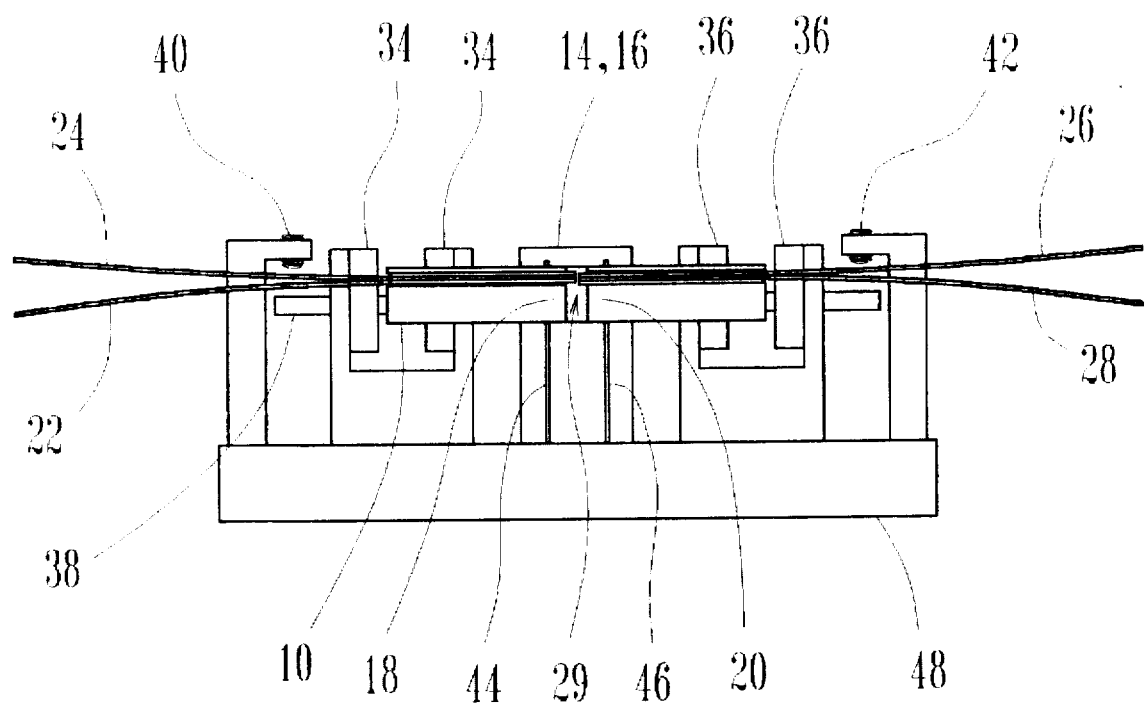
FIG. 1b is a front view of the switch of FIG. 1a in a neutral position.

FIG. 1b shows a front view of the embodiment of FIG. 1a in a neutral position wherein the flexible ring 10, the drive coil 30 (not visible in this view) and the arm 38 are in a horizontal position. In this view, the ends of the optical fibers adjacent to the gap 29 are not in a useful aligned state and an optical signal cannot be passed from a left optical fiber end to a respective right optical fiber end at the gap 29. The members 44, 46 can be seen to fix the left and right ends 18, 20 of the flexible element 10 to a common base 48 and take the form of a slender rod or wire. The members 44, 46 serve to constrain the ends 18, 20 of the member 10 from vertical upwards motion while still allowing the ends 18, 20 to tilt or rotate torsionally, about the longitudinal axis of the member 10. Alternately members 44, 46 could be partially or fully of an elongated cross-section such as an eliptical or a rectangular shape.

The left and right adjustable stops 40, 42 have screws associated with blocks affixed to the base 28 of the switch. The adjustable stops are shown positioned above the control arm 38 on either side but could alternately be placed below the control arm. The adjustable stops could also be arranged to directly engage the member 10 as an alternative means of controlling the pivotal movement of the member 10, in which case the control arm 38 would not be required. The relative alignment of the optical fibers is easily adjusted using common screw type elements as the structure itself provides a significant reduction of motion.

Figure 2A:
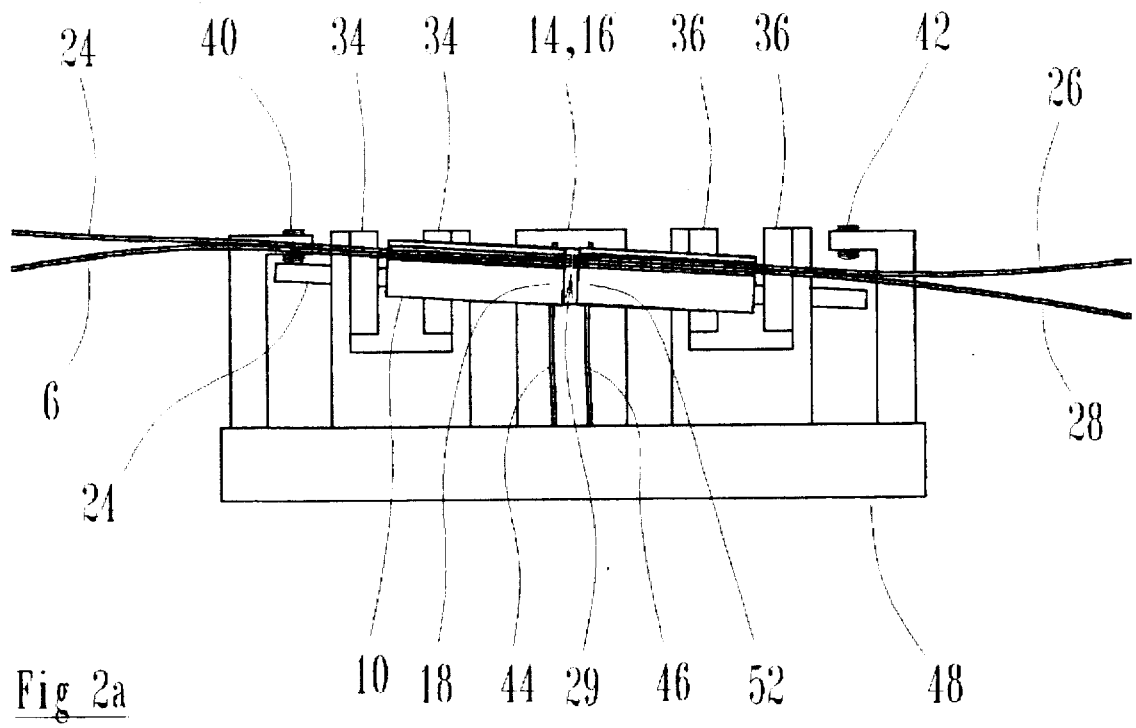
FIG. 2a is a front view of the switch of FIG. 1a with the drive coil powered.

FIG. 2a illustrates the switch of FIG. 1a and FIG. 1b in one of two desired states corresponding to a current of a certain polarity in the drive coil 30 (FIG. 1a), in particular with the control arm 38 engaging the left adjustable stop 40.

This state corresponds to an assembly position wherein the optical fibers 22, 24 are mounted onto the ring 10, and in particular where the first left (input) optical fiber 22 is looped around the member 10 twice to form a first right (output) optical fiber 26 while the second left input fiber 24 is wound once around the element 10 to extend into a second right output optical fiber 28. After the gap 29 has been sawn, the respective left and right optical fiber ends at the gap 29 remain in optical alignment provided that the optical fibers were mounted onto the member 10 in a stress free manner so as not to cause significant misalignment of the optical fiber ends after the working gap 29 is formed. Should it be desirable to form the gap 29 at an angle 47 (FIG. 2b) in order to reduce optical reflections at the optical fiber ends at the gap 29, then a slight adjustment of the left adjustable stop 40 would be required to achieve a maximum or desired level of optical energy to be transmitted across the gap 29 at the respective aligned left and right optical fiber ends. In this view, the rod members 44, 46 appear slightly bent and serve to maintain a nearly equal vertical height of the ends of the member 10 where they fasten them to the base 48. In other words, the members 44, 46 vertically pin the left and right ends 18, 20 of the member 10 at an equal distance from an axis of rotation coincident with the shaft member 12.

Figure 2B:
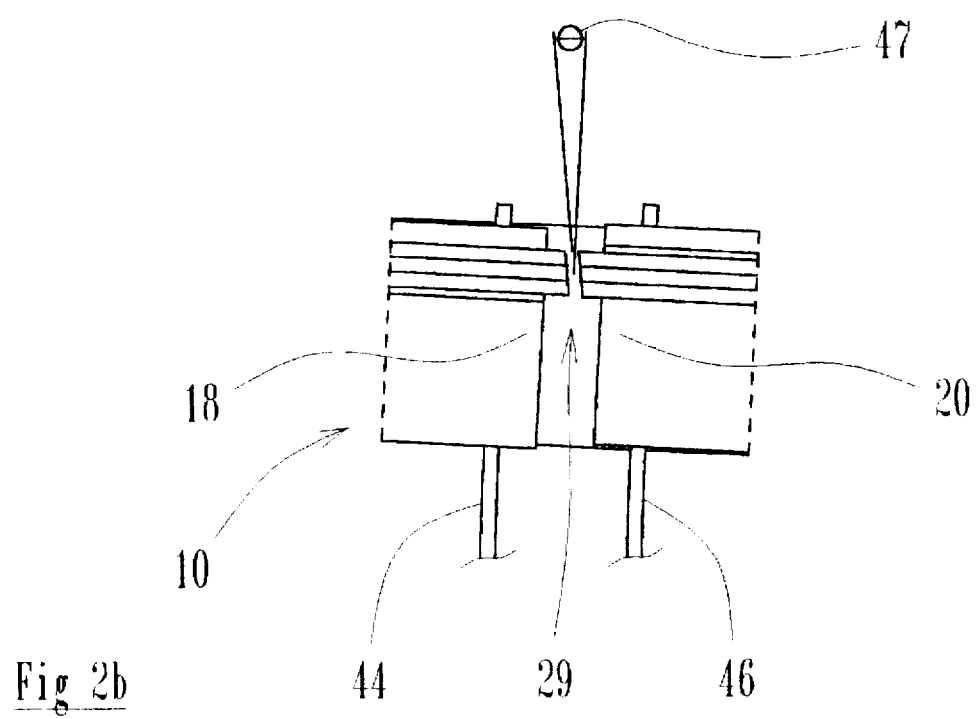

FIG. 2b illustrates an enlarged view of the gap 29 and cutaway portions of the left end 18 and right end 20 of the member 10 wherein the result of the pinning effect of the elements 44, 46 on the ends of the element 10 can be seen in more detail. As the left side of the control arm 38 engages the left adjustable stop 40 (FIG. 2a), the element 10 undergoes a clockwise rotation thus causing the right tip of the left side 18 of the member 10 to move in a relative downward direction and the left tip of the right side 20 of the element 10 to move in a relative upward direction. The left and right optical fiber ends at the gap 29 affixed to and projecting from the left end 18 and right end 20 respectively of the member 10 can be seen to be in alignment.

Figure 2C:
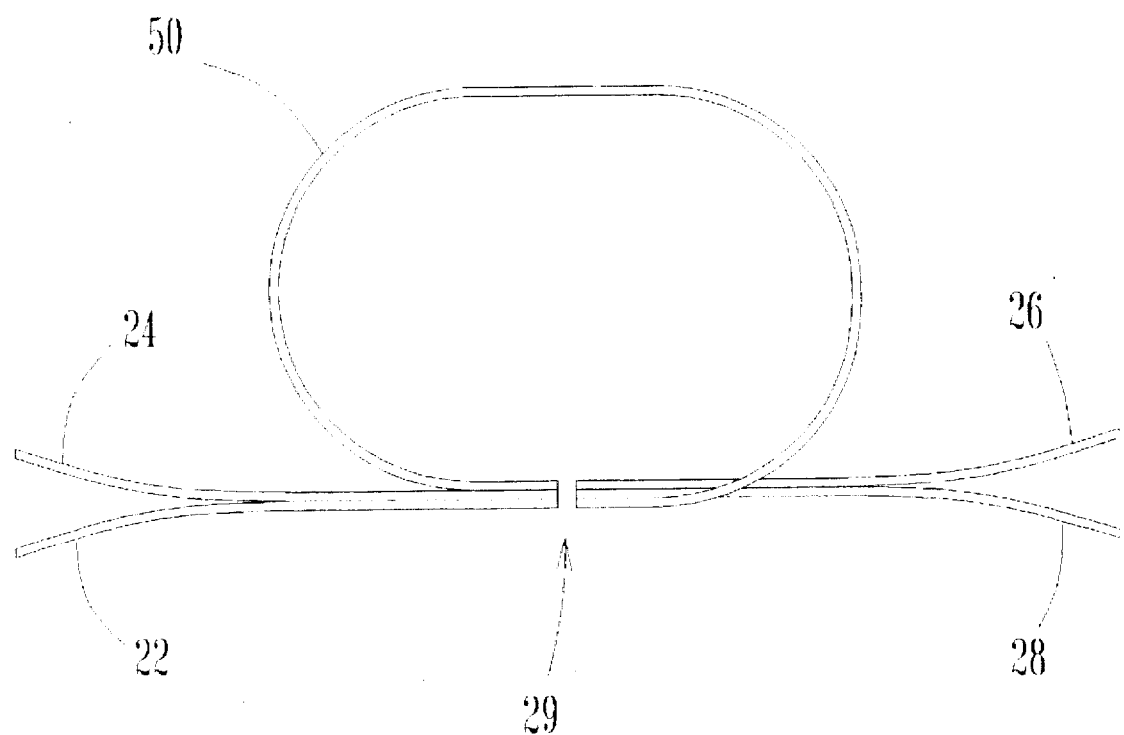
FIG. 2c is a schematic representation of the alignment of the optical fibers of the switch of FIG. 2a in the assembly position with the bypass optical fiber in use.

In FIG. 2c there are shown the optical paths of the switch of FIG. 2a in the assembly state. A first optical path is formed with the right end of a first left optical fiber 22 as it aligns at the gap 29 with the right end of a loop-shaped, or bypass, portion of optical fiber 50 consisting of an additional length of optical fiber mounted onto the ring 10, and passes from the left end of the loop-shaped portion of optical fiber 50 across the gap 29 a second time and aligns with the left end of a first right optical fiber 26. A second optical path is formed with the right end of a second left input optical fiber 24 as it aligns at the gap 29 with the left end of a second right optical fiber 28.

Figure 3A:
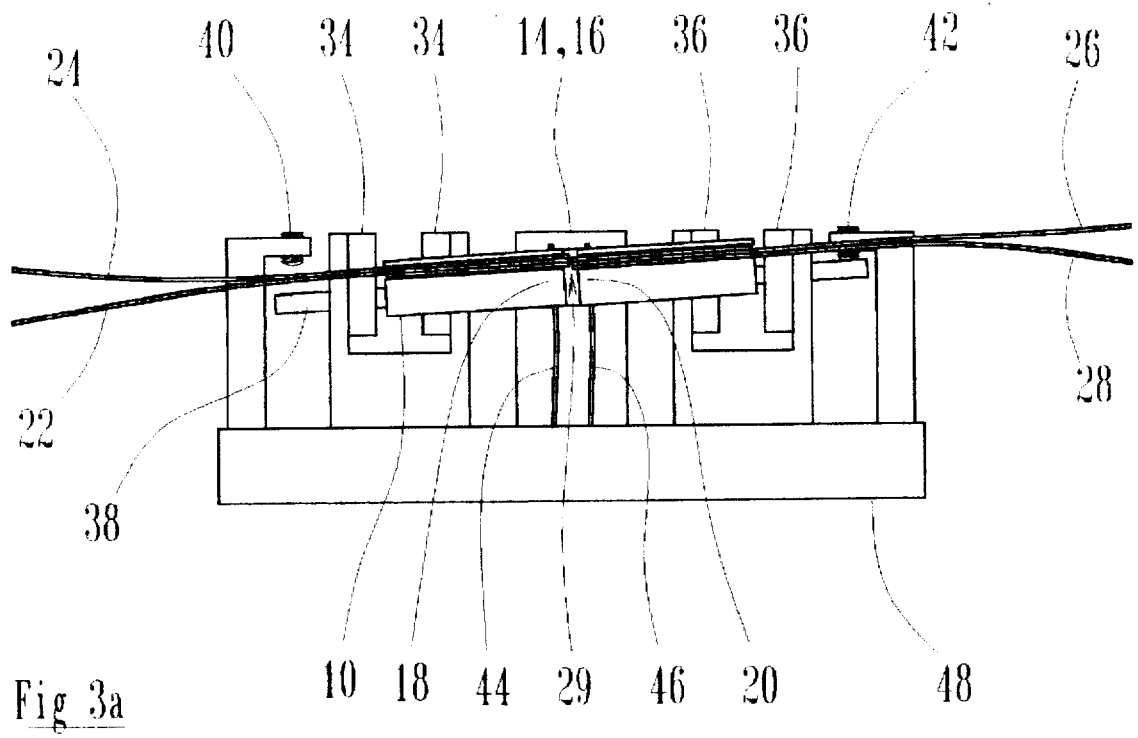
FIG. 3a is a front view similar to that of FIG. 2a with the current to the drive coil reversed resulting in an opposite displacement of the switch.

FIG. 3a shows the switch of FIG. 1a with the drive coil 30 having an opposite polarity of electric current connected to its input leads 32 as compared to FIG. 2a, resulting in a counter-clockwise rotation of the control arm 38 such that the arm engages the right adjustable stop 42. This state will be referred to as the switched state. In the switched state the rod members 44, 46 are bent in an opposite direction to that of the assembly state shown in FIG. 2a. As was the case in FIG. 2a, the left end 18 and the right end 20 of the element 10 are constrained in the vertical direction by the rod members 44, 46 at their attachment points. The fiber ends at each side of the gap 29 can be seen to move laterally in a precise relative differential manner. The system provides a significant mechanical advantage of motion which greatly improves the setablility of the adjustable stops 40, 42 and can be shown to be related to the ratio of the length of the control arm 38 to that of the spacing between the rod elements 44, 46.

Figure 3B:
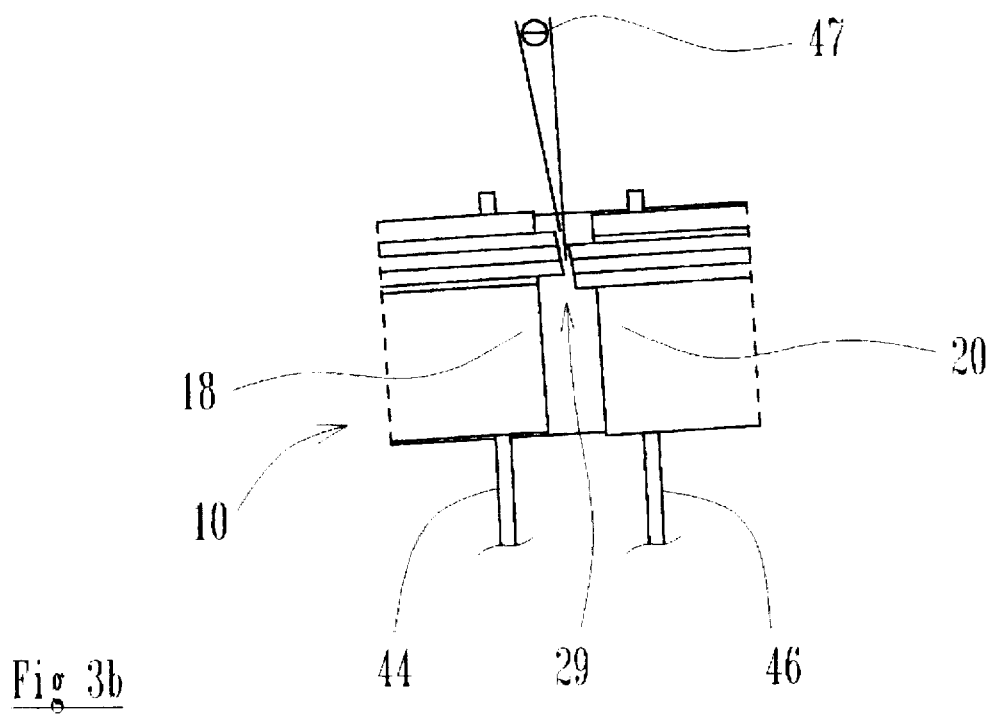

The differential motion of the fiber ends, opposite to that of FIG. 2b can be seen by way of example in FIG. 3b. In this case, the right tip of the left side 18 of the ring 10 moves in a relative upward direction while the left tip of the right end 20 of the ring 10 moves in a relative downward direction. As indicated, the effective optical paths have been changed compared to FIG. 2b; the right end of the middle left optical fiber now aligns with the left end of the top right optical fiber and the right end of the bottom left fiber now aligns with the left end of the middle right fiber at the gap 29. The right adjustable stop 42 is set so as to allow a maximum or desired level of optical energy to be transmitted between respective left and right fiber ends across the gap 29.

Figure 3C:
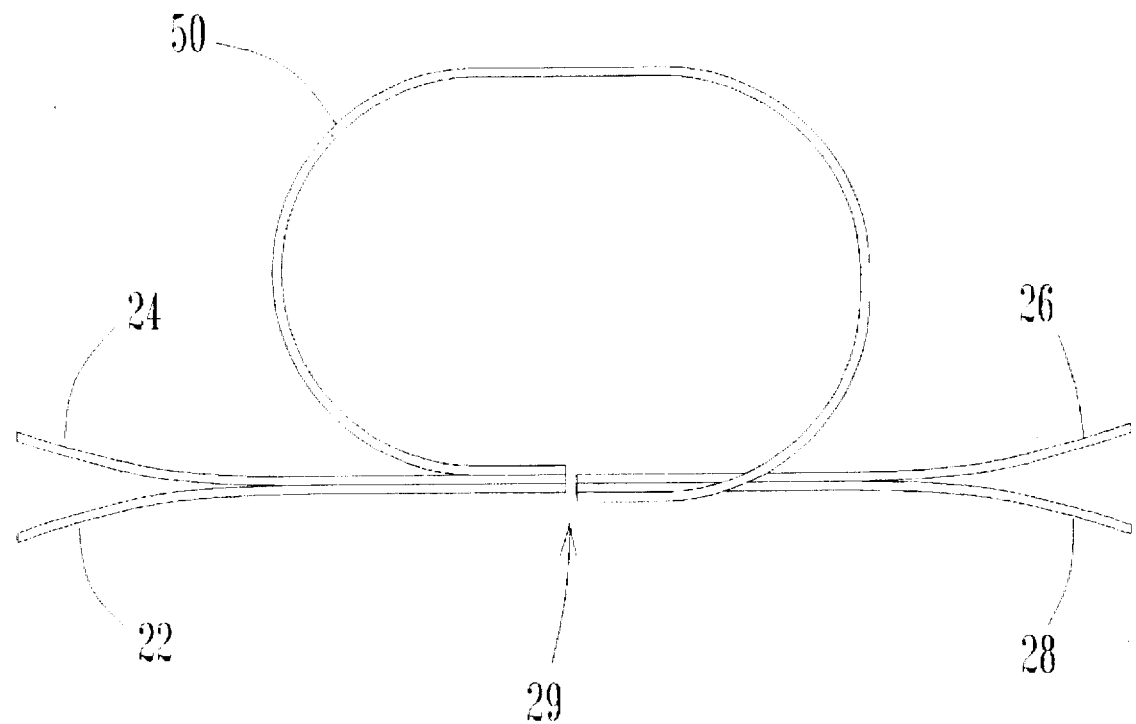
FIG. 3c is a schematic representation of the alignment state of the optical fibers of FIG. 3a in the switched position with the bypass optical fiber not in use, the respective optical paths having been interchanged as compared with those of FIG. 2c.

Turning now to FIG. 3c, there is shown a schematic representation of the optical paths of the switch as shown in FIG. 3a in the switched state. A first optical path is formed with the right end of a first left optical fiber 22 as it aligns at the working gap 29 with the left end of a second output optical fiber 28. A second optical path is formed with the right end of a second left input optical fiber 24 as it aligns at the working gap 29 with the left end of first right output optical fiber 26. It can be seen that the optical paths have been reversed or rather crossed over compared to the assembly state as shown in FIG. 2c. In the switched state, the bypass loop of optical fiber 50 is not used.

Figure 4A:
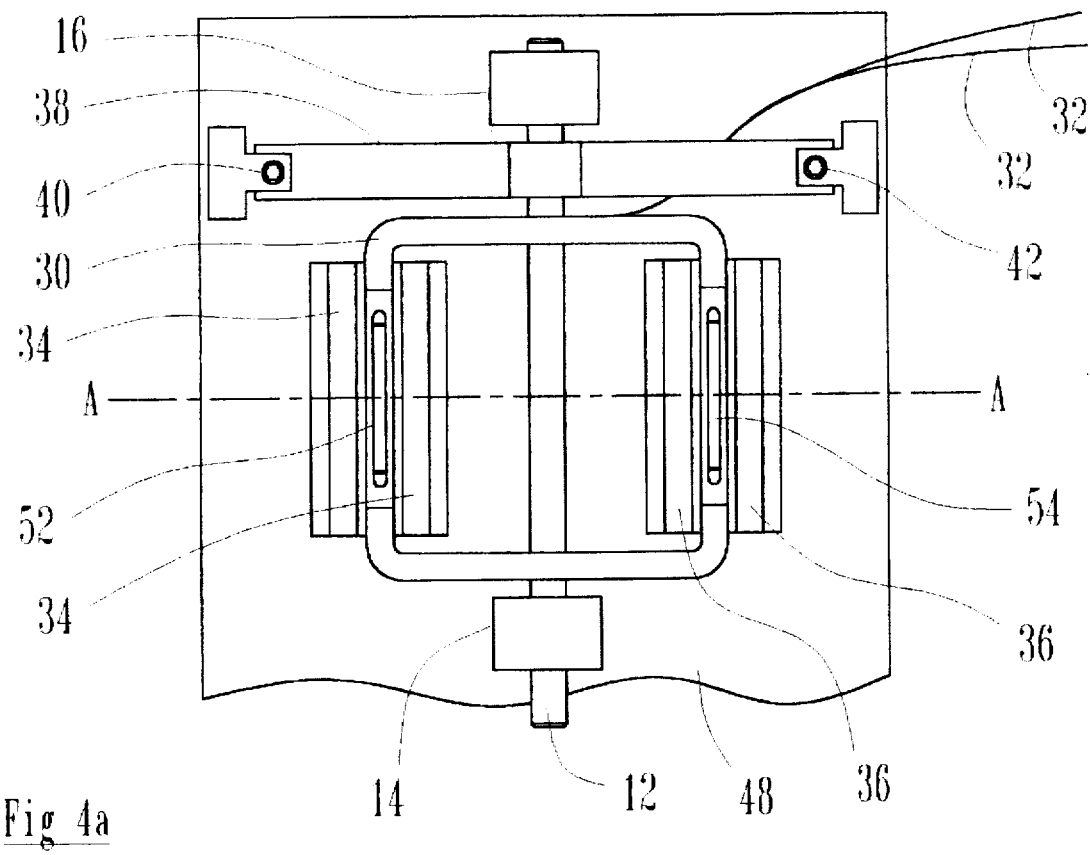
FIG. 4a is a top plan view of the drive assembly with the addition of magnetic latching means to provide state retention when the drive is not energized.

In many cases, an optical switch is required to maintain its state of alignment without the application of electrical current. As shown in FIG. 4a, a non-contact latching means for providing state latching of the switch is added to the drive assembly of FIG. 1a. The latching means is embodied by one or more magnetic elements attached to the drive coil 30. Such magnetic elements need not be attached to the drive coil 30 but could instead be mounted onto a lever type arm or be fastened to the element 10 or to an alternate location. In order to realize a latching type bypass or two-to-two switch, two magnetic elements 52 and 54 are added to the existing structure. To minimize the number of additional parts, the magnetic elements 52 and 54 are adapted to interact with the existing magnetic fields of the motor assembly magnets 34 and 36 respectively. It is also feasible to use a single magnetic element moving between two additional magnets to make a bi-stable magnetic latch. The magnetic elements 52,54 are fastened to a drive coil 30 that has been modified slightly to provide raised affixment regions for said magnetic elements.

Figure 4B:
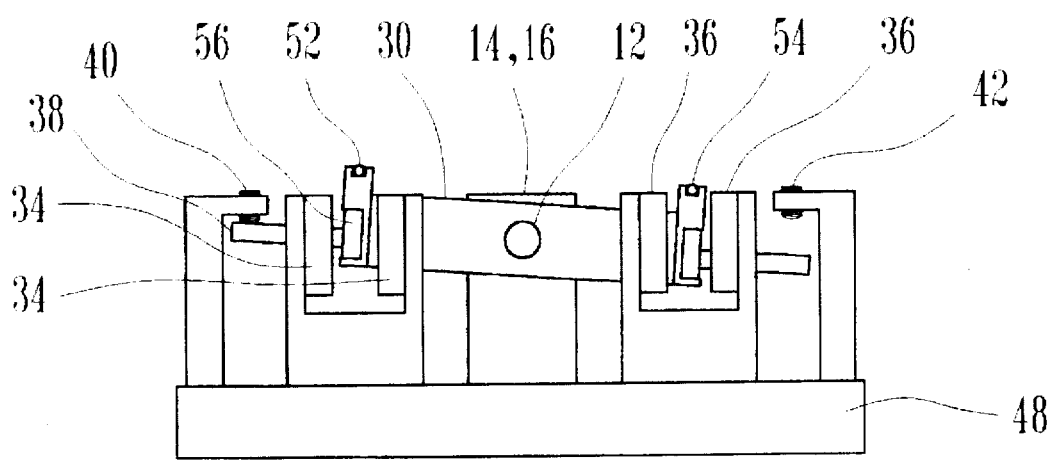
FIG. 4b is a cross-sectional view along the line A—A of the drive assembly shown in FIG. 4a, and FIG. 5 is a perspective view of an alternative embodiment of the switch of the invention.

A cut-away view A—A of the drive assembly of FIG. 4a is given in FIG. 4b for clarification of the design and operation of the magnetic elements 52, 54. The drive assembly is shown in a state similar to that of FIG. 2a wherein the left adjustable stop 40 is engaged by the arm 38, the arm being partly blocked from view. It can be seen that the right magnetic element 54 is closer to its respective magnets 36 than the left magnetic element 52 is to magnets 34. As a result, the right magnetic element 54 will be subject to a greater downward magnetic pull than the left magnetic element 52. If the imbalance of the resultant magnetic forces is sufficient to generate a torque in excess of that required to rotationally displace the element 10 such that the arm 38 engages a respective stop, then the switch will remain latched (or in its last state of operation) after the power to the drive coil is disconnected. The drive coil 30 is shown in cross section to consist of a bobbin type form that contains a wire winding 56.

The invention can also be implemented as an on-off type switch which has a powered and unpowered state similar for instance to an assembly state as illustrated in FIG. 2a and a switched state as depicted e.g. in FIG. 3a, wherein only one magnetic element is installed. In such an arrangement, the downward magnetic pull on one magnetic element could be made sufficient to generate a torque in excess of that required to rotationally displace the element 10 and cause an engagement of the respective stop member when the drive coil 30 is unpowered. When the drive coil is powered such that it generates a torque greater than the holding torque provided by the magnetic element, then the switch will change its state. It is of course possible to use additional spring elements or the natural compliance of the member 10 itself in order to implement a on-off type switch as shown in FIG. 1a and FIG. 1b; however, magnetic means are preferable as the force on a magnetic element acted on by a magnetic field diminishes as it is moved away from the source of the magnetic field. A spring on the other hand, produces a larger force as it is deformed.

It is possible to assemble the switch in a different assembly position than that shown in FIG. 2a. Likewise, a different switched position can be used than that of FIG. 3a. All that is required to make the switch operable is that a sufficient rotational motion be transformed into a required relative movement of the optical fiber ends at the gap.

Figure 5:
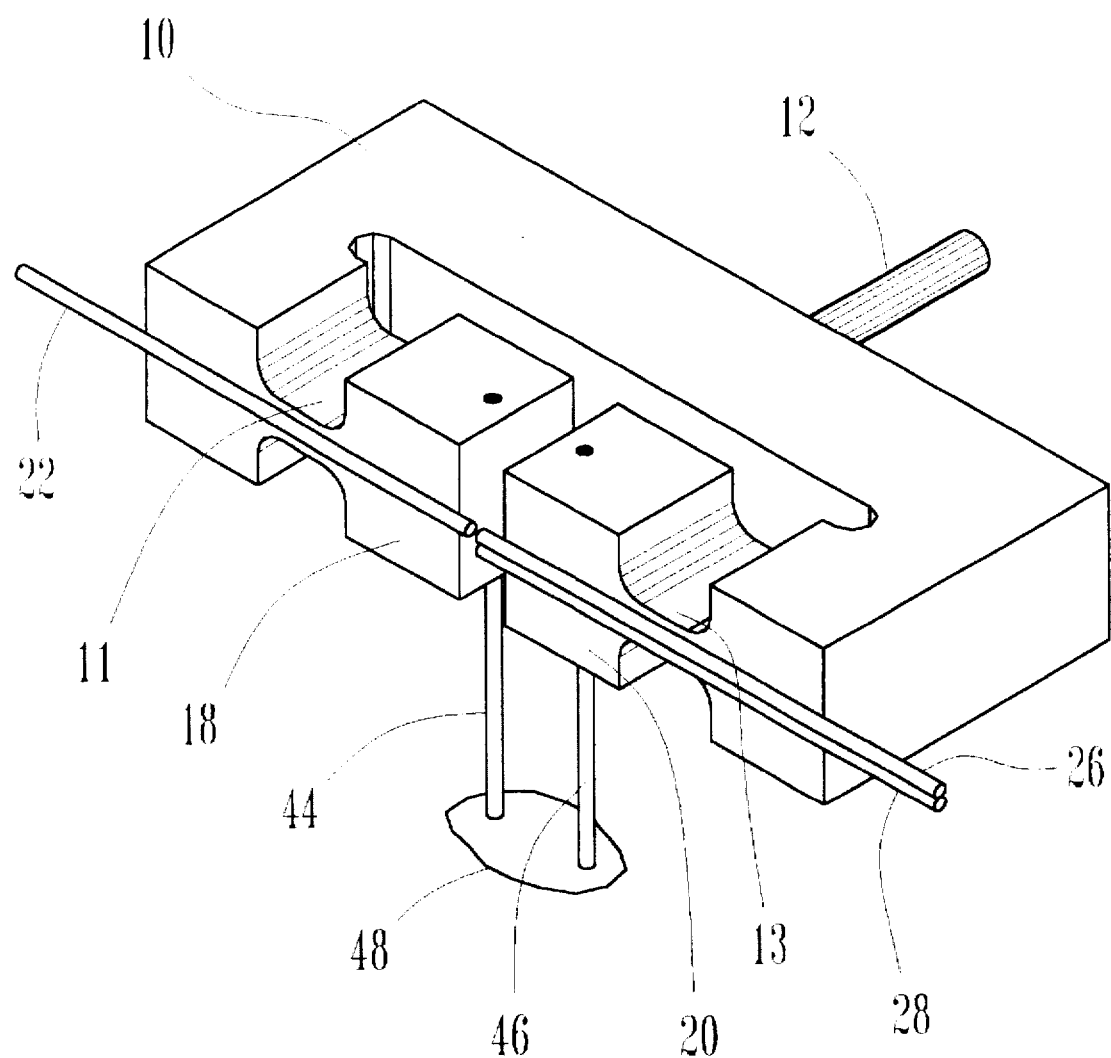

It will be appreciated that the invention can be used as a one-to-two switch, without the bypass fiber coil or coils, and without the pivotable means forming a loop. In an alternative embodiment of the invention shown in FIG. 5, where like numerals denote like elements as in the preceding drawings and some details of FIG. 1a have been omitted for clarity, the pivotable means is embodied by a frame 10 which is joined with two fiber support members 18, 20 by means of two flexible portions 11, 13. The pivoting displacement is imparted onto the frame 10 and the members 18, 20 through the shaft 12 driven by a stepper motor or an electromagnetic coil, not shown. An input fiber 22 is attached with an adhesive to the member 18, and two output fibers 26, 28 are similarly attached to the member 20 such as to allow the positioning of the input fiber 22 in an alternate alignment with either of the output fibers 26, 28.

The pivotal displacement of the members 18, 20 along with the frame 10 is restrained by the flexible rods 44, 46 which are fixed to the base structure 48 of the switch.

In operation, a pivotal displacement of the frame 10 in, say, clockwise direction, will result in a slight axial displacement of the opposite ends of the fibers 22 and 26 or 28 due to the restraining action of the left rod 44 and flexing of the portion 11. A relatively large mechanical advantage is realized if the span of the frame 10 is significantly larger than the spacing between the attachment points of the rods 44, 46 to the members 18, 20 respectively.

It will be appreciated that the structure has practically no elements which would be subject to frictional wear resulting in a gradual deterioration of the quality of operation of the switch.

The embodiments described and illustrated herein are such that both ends of the pivotable means (fiber support members) are pinned using compliant members of high axial stiffness so as to generate a relative differential lateral displacement of the opposite optical fiber ends at the working gap. Alternatively, it is also feasible to use a single compliant member of high axial stiffness to constrain only one end of a flexible optical fiber support member. However, approximately twice the rotational displacement of the flexible optical fiber support member would be required to achieve a switching function wherein a relative lateral displacement of at least one optical fiber diameter is achieved between respective optical fiber ends at the gap.

It is understood that the optical paths are bi-directional and that an input optical fiber can serve equally well as an output optical fiber.

The switch described in FIG. 1a can also be assembled in a number of other possible configurations. One such configuration that would lend itself to a compact packaging design would be one wherein the drive coil acts directly on the pivotable member and is located either adjacent to it or is made to fit either inside or outside if it. It is also possible to eliminate the need for a separate control arm by having stop members engage either a portion of a drive coil or the flexible optical fiber support member itself or another part of the moving portion of the assembly.

The invention as described could also be used as an optical fiber optical power level attenuation device by adjusting the desired level of transmitted optical energy by means of either of the adjustable stop members.

Other variations of the concept of a torsionally actuated flexible optical fiber support member can be considered without deviating from the scope of the invention. For example, it is possible to add or fabricate into the support member other flexure type elements so as to increase its resistance to optical fiber end misalignment caused by external forces. For example, if the optical fibers consisting of silica glass which has a different coefficient of thermal expansion than that of most structural materials (FIG. 1a) are fastened around the perimeter of the pivotable member or frame, then an increase in temperature could result in an increase of the spacing of the optical fiber ends. A compliant member of high axial stiffness could be mounted between the sides of the pivotable member or frame to minimize such a temperature influence.

I claim:

1. An optical switch comprising:
    two fiber support members having each a proximal end and a distal end, the proximal ends adjacent to and spaced from each other,
    at least one optical waveguide secured to each of said fiber support members, said optical waveguides on both support members having closely spaced, optically aligned end portions extending therealong substantially parallel to a common optical axis and defining a gap therebetween,
    a pivotable means having two opposite ends and at least one flexible portion, said opposite ends connected respectively to said fiber support members at their distal ends,
    drive means for pivoting said pivotable means along with said fiber support members about a pivot axis,
    restraining means attached to at least one of said support members at an attachment point intermediate the respective distal end and proximal end of said at least one support member to prevent said at least one support member at the attachment point from moving laterally relative to said common optical axis,
    the arrangement being such that upon activating said drive means, said pivotable means pivots about said pivot axis causing a displacement of the distal end of said at least one fiber support member wherein said support member, with the respective waveguide end portion, tilts about said attachment point whereby said end portions of said waveguides move laterally relative to each other to effect a switching action.

2. The switch of claim 1 further having stop means disposed to engage said pivotable means such as to limit in a predetermined manner the pivoting motion of said pivotable means in at least one direction.

3. The switch of claim 1 wherein said pivotable means is integral with said fiber support members and forms a loop having two ends, said fiber support members disposed at the ends of said loop.

4. The switch of claim 3 wherein said loop is connected to said drive means for pivoting about an axis substantially aligned with said gap.

5. The switch of claim 3 wherein said loop has a curvature exceeding a minimum bending radius of said waveguide.

6. The switch of claim 5 wherein a length of a waveguide is wound along said loop with end portions of said waveguide disposed in the vicinity of said gap to provide an optical bypass path.

7. The switch of claim 1 wherein said restraining means are each disposed at a smaller distance from said proximal ends than from said distal ends to provide a predetermined reduction of motion of said proximal ends compared to a pivotal motion of said pivotable means.

8. The switch of claim 3 wherein said pivotable means comprises an arm associated with said loop for a simultaneous pivoting motion, said switch further having stop means disposed to engage said arm such as to limit in a predetermined manner the pivoting motion of said arm in at least one direction.

9. The switch of claim 1 wherein said restraining means are associated with both fiber support members.

10. The switch of claim 1 wherein said drive means comprises an electromagnetic coil associated with said pivotable means for simultaneous pivoting therewith, and stationary magnetic means disposed to impart a torque on said coil when an electric current is applied to said coil.

11. The switch of claim 10 further comprising a non-contact latching mechanism for maintaining said pivotable means in a predetermined position when said drive means is non-operational.

12. The switch of claim 11 wherein said latching mechanism comprises at least one magnet means associated with said pivotable means and disposed to interact magnetically with said stationary magnetic means.

* * * * *